United States Patent [19]
Nikolaev et al.

[11] 3,779,868
[45] Dec. 18, 1973

[54] MICROBIOLOGICAL METHOD OF PRODUCING EDIBLE ACETIC ACID

[76] Inventors: Petr Ivanovich Nikolaev, Pulkovskaya ulitsa, 27, kv. 105; Jury Lazarevich Ignatov, ulitsa F. Poletaeva, 28, kv. 153; Sergei Ivanovich Smirnov, Shmidtovsky proezd, 9, kv. 29; Naum Izrailevich Oxengorn, ulitsa letchkka Babushkina, 27, kv. 8; Rimma Fominichna Gigineishvili, ulitsa Ulyanova, korpus 1, kv. 54; Klara Moissevna Dvorkina, pereulok, 11, kv. 3; Akhmet Mukhsinyatovich Iskandyarov, Yartsevskaya ulitsa, 27, korpus 4, kv. 36, all of Moscow, U.S.S.R.

[22] Filed: July 15, 1971

[21] Appl. No.: 162,793

[52] U.S. Cl................ 195/49, 195/30, 99/147
[51] Int. Cl................ C12d 1/02, C12j 1/04
[58] Field of Search............ 195/49, 30; 99/147

[56] References Cited
UNITED STATES PATENTS
2,997,424  8/1961  Mayer.................. 195/49

FOREIGN PATENTS OR APPLICATIONS
44/17,996  8/1969  Japan.................. 99/147

Primary Examiner—Alvin E. Tanenholtz
Attorney—Eric H. Waters et al.

[57] ABSTRACT

A microbiological method of producing edible acetic acid consists in cultivating acetic-acid bacteria in a continuous-growth process on a culture medium containing ethanol, acetic acid, mineral salts and water, under aeration; then the starting culture medium is continuously fed into the resultant culture liquid containing at least 2.5 vol. percent of acetic acid produced, at a flow rate necessary to maintain said acetic acid concentration; the resulting culture liquid is continuously discharged at the abovesaid flow rate for the ethanol to be further oxidized by acetic bacteria into acetic acid, the ethanol oxidation process being at least twice repeated depending upon the predetermined acetic acid concentration and occurring under aeration of the culture liquid and a simultaneous feeding of ethanol thereto in an amount sufficient to obtain the required acetic acid concentration, the concentration values of both acetic acid and ethanol at each oxidation step being maintained constant.

The herein-disclosed method is applicable in the food industry.

4 Claims, 1 Drawing Figure

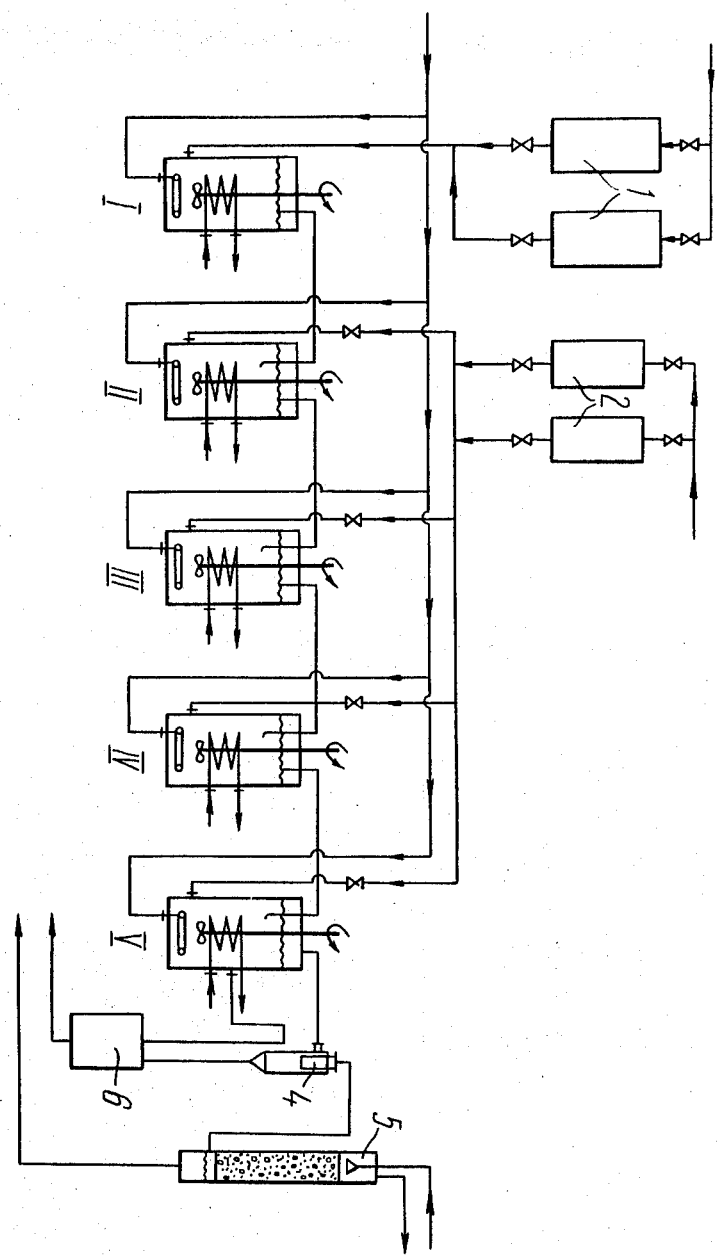

MICROBIOLOGICAL METHOD OF PRODUCING EDIBLE ACETIC ACID

The present invention relates generally to methods of producing acetic acid and, more specifically, to a microbiological method of producing edible acetic acid applicable in the food industry.

Microbiological methods of producing edible acetic acid, are known in which acetic-acid bacteria are grown on a culture medium comprising ethanol, acetic acid, mineral salts and water, in a fermenting apparatus under constant stirring and aeration. The growth process runs 8–10 days till the maximum concentration of acetic acid is produced, viz. up to 6–12 vol. percent, whereupon part of the culture liquid is drained off from the fermenting apparatus and the fermented acetic acid is isolated therefrom, while to the remaining culture liquid is added some more culture medium and the fermentation process is recycled several times until the activity of the inoculated culture is found to decrease.

Such being the case, the fermenting apparatus is discharged, and the culture is re-inoculated thereinto. The yield of acetic acid is 85–90 vol. percent at a daily output of 15–20 kg thereof (as calculated for a 100-percent acetic acid) per cu.m of the fermenting apparatus.

Said intermittent submerged-cultivation process suffers from a number of disadvantages such as: long duration of the process and low efficiency thereof due to the involvement of a number of unproductive stages such as lag phase (taking up to 2–3 days), period of taking off the finished product, preparation period to the next cycle; cultivation of a complex of the cultures of acetic acid bacteria since work on a pure culture when practising the intermittent submerged-fermentation method involves heavy difficulties and proves to be impractical.

It is an object of the present invention to increase the efficiency of the process and to run it with the use of a high-activity culture of acid bacteria featuring high specific growth rate.

Said object has been accomplished due to the fact that in a microbiological method of producing edible acetic acid by cultivating acetic-acid bacteria on a culture medium, comprising ethanol, acetic acid, mineral salts and water, under aeration, followed by separating and purifying the specific product, according to the invention, the starting culture medium comprising 4 – 7 vol. percent ethanol is continuously fed to the aerated culture liquid containing at least 2.5 vol. percent of acetic acid that has been obtained by inoculating acid bacteria into the abovesaid culture medium, at a flow rate necessary to maintain the aforesaid acetic acid concentration, the resulting culture liquid is continuously discharged at the above-stated flow rate to be further oxidized by acetic acid bacteria into acetic acid, the ethanol oxidizing process being at least twice repeated to suit the required acid concentration and proceeding under aeration of the culture liquid and a simultaneous feeding of ethanol thereto taken in an amount sufficient to obtain the desired acetic acid concentration, the concentration values of both acetic acid and ethanol at every oxidation step being maintained constant.

The starting culture medium for the process is expedient to comprise:

ethanol 4–7 vol. percent, acetic acid 0.5–1.0 vol. percent, disubstituted ammonium phosphate 1 g/l, monosubstituted potassium phosphate 0.5 g/l, magnesium sulfate 0.5 g/l, water being the balance up to 1 liter.

To provide a higher yield of acetic acid and to obtain an increased (up to 12 vol. percent) concentration thereof, the culture medium is fed at a rate necessary to maintain the concentration of the resulting acetic acid within the limits of 2.7 to 3 vol. percent.

It is preferable that the incipient stage of cultivation be run at 29°–31°C and an aeration rate of 2.2 kg $O_2$/cu.m per hour with respect to sulfite, followed by a temperature reduction down to 25°–26°C and a decrease in aeration rate to 0.3–0.5 kg $O_2$/cu.m per hour with respect to sulfite at every oxidation step.

The process runs continuously in a bank of cascade-connected fermenting apparatus units. A culture medium, preferably of the following composition: ethanol 1.1–1.2 vol. percent, acetic acid 1.8–2.1 vol. percent, disubstituted ammonium phosphate 1 g/l, monosubstituted potassium phosphate 0.5 g/l, magnesium sulfate 0.5 g/l, water being the balance up to 1 liter, is charged into the first apparatus of the cascaded bank, then in the following apparatus units in succession, whereupon all the apparatus units are inoculated with the culture of acetic-acid bacteria *Acetabacter. aceti*. To obtain a high-concentration of acetic acid the process is expedient to occur in five cascade-banked apparatus units.

Air is fed to all the apparatus units at a constant rate specified for each particular apparatus units.

The growth of fermentation process runs at 29°–31°C and an aeration rate of 2.2 kg $O_2$/cu.m per hour with respect to sulfite in the first apparatus units, with subsequent reduction of temperature and decrease in aeration rate in each of the following apparatus units down to 25°–26°C and 0.3–0.5 kg $O_2$/cu.m per hour with respect to sulfite, respectively.

The resultant culture liquid from the first apparatus unit is continuously fed to the second, whence it flows to the third apparatus unit and so on to the last apparatus units of the bank. In addition an aqueous ethanol solution at a concentration in excess of 30 vol. percent, or straight ethanol in an amount necessary to obtain acetic acid of the predetermined concentration is fed to the second and to all the following apparatus units. The concentration of the resulting acetic acid in the first apparatus unit of the bank may vary but not less than 2.5 vol. percent depending upon the final acetic acid concentration and upon the required production capacity. The starting culture medium of the following composition: ethanol 4–7 vol. percent, acetic acid 0.5–1.0 vol. percent, disubstituted ammonium phosphate 1 g/l, monosubstituted potassium phosphate 0.5 g/l, magnesium sulfate 0.5 g/l, water being the balance up to 1 liter, is continuously fed into the first apparatus unit at a rate necessary to maintain the acetic acid concentration therein not below 2.5 vol. percent. At the same flow rate the culture liquid is continuously discharged from the first apparatus to the second one, so that an optimum ethanol concentration corresponds to the concentration of acetic acid in each of the apparatus units. We have established the growth factor of the acetic acid bacteria to be extremely dependent upon the ethanol concentration in the culture liquid, i.e., the optimum concentration value of ethanol that corresponds to the maximum value of the growth factor of acetic acid bacteria, decreases with the increase of acetic acid concentration in the culture liquid.

The concentration values of both acetic acid and ethanol are maintained constant in each of the apparatus units.

The specific product is discharged from the last apparatus unit of the bank for filtration and purification.

The yield of the specific product is 88–95 vol. percent of theory, the daily output equalling 40–50 kg. of acetic acid (as calculated for a 100 per cent acid) per cu.m.

To increase the output of the specific product the rate of liquid flow through the apparatus units must be increased so as to obtain the finished product from, say, the fifth apparatus unit. Conversely, in order to decrease the output of the specific product the rate of liquid flow through the apparatus units is to be reduced so as to obtain the finished product from, say, the third apparatus unit.

For the output to increase the concentration of acetic acid in the first apparatus unit must be decreased. The proposed method may be carried into effect not only in a bank of cascade-connected apparatus units but also in some other types of apparatus, such as sectionalized, tray- the rectification column type), or others. The herein-disclosed method provides for producing acetic acid of a continuously high concentration amounting up to 12 vol. percent. Each of the apparatus units contains the culture of acetic acid bacteria at a certain age and maintains constant the optimum conditions for the vital activity of said culture to which it gets adapted and which promote the oxidation activity thereof. Under conditions of a continuous flow-type submerged cultivation, the first apparatus is a generator of acetic acid bacteria necessary at all oxidation steps and, moreover, a vigorous oxidation of ethanol into acetic acid occurs therein.

The most active culture of acetic acid bacteria persists in all the apparatus units of the bank, this being due to the fact that the culture featuring lower specific growth rate gets washed out from the system. The proposed method dispenses with lag phase, period of taking off the finished product and charging the apparatus for the next working cycle, all said operations being indispensable in the conventional method. Dispensing with these unproductive stages leads to a considerable increase in the daily output of the process up to 40–50 kg of acetic acid (as referred to a 100 per cent acid) per cu.m as compared to 15–20 kg by the conventional method.

To promote understanding given below are some examples of the embodiment of a microbiological method of producing edible acetic acid to be considered with reference to the accompanying drawing.

From gravity-feed tanks 1 the culture medium of the following composition: ethanol 4–7 vol. percent, acetic acid 0.5–1.0 vol. percent, disubstituted ammonium phosphate 1 g/l, monosubstituted potassium phosphate 0.5 g/l, magnesium sulfate 0.5 g/l, water being the balance up to 1 l, is fed to a fermenting apparatus or cultivator I.

The effective volume of said apparatus is 19.6–20 liters of unaerated culture liquid. In the fermenting apparatus I acetic acid bacteria oxidize ethanol into acetic acid of a concentration $P_1 = 30.1$ g/l at an air consumption rate of 0.2 l/l/min and a temperature of 32°C, the ethanol concentration $S_1$ in said apparatus being equal to 14.5 g/l, dilution factor $D_1 = 0.091$ l/hr, said factor being equal to the microorganism growth factor $\mu$, i.e., $D = \mu$. The dilution factor is calculated by the formula:

$$D = V_t/V_e \text{ hr}^{-1},$$

where $V_t$ — the amount of culture medium fed into the apparatus per unit of time, cu.m/hr. $V_e$ — effective volume of the apparatus, cu.m.

From the fermenting apparatus I the culture liquid containing acetic bacteria, is continuously fed into the fermenting apparatus II, where the concentration of acetic acid acid is increased to $P_2 = 59.5$ g/l; further, the culture liquid along with acetic acid bacteria is fed into the fermenting apparatus III, wherein the acetic acid concentration is brought up to $P_3 = 79.3$ g/l, thence into the fermenting apparatus IV wherein the concentration becomes equal to $P_4 = 89.5$ g/l, and, finally, into the fermenting apparatus V, wherein the concentration of acetic acid is brought up to $P_5 = 96$ g/l.

All of the abovesaid fermenting apparatus units are preliminarily inoculated with the culture of *Acetobacter. aceti* seeded on the culture medium of the above-stated composition.

Along with the culture medium, aqueous ethanol at a concentration in excess of 30 vol. percent is fed into the fermenting apparatus II; III; IV; V from gravity-feed tanks 2 through flow-rate meters (not shown in the drawing), the ethanol concentration in said fermenting apparatus being as follows: in the apparatus II $S_2 = 9.0$ g/l; in the apparatus III $S_3 = 9.6$ g/l; in the apparatus IV $S_4 = 7.3$ g/l; in the apparatus V $S_5 = 2.9$ g/l. A temperature of 31°C and an air consumption rate of 0.2 l/l-min are maintained in the apparatus II which corresponds to a consumption rate of 2.2 kg $O_2$/cu.m per hour as referred to sulfite; a temperature of 30°C and an air consumption rate of 0.2 l/l-min are effective in the apparatus III, 27.5°C and 0.2 l/l-min in the apparatus IV, and 26°C and 0.2 l/l-min in the apparatus V.

From the fermenting apparatus V the culture liquid is discharged into an intermediate receiver tank 6 for further separation of the biomass and isolation of acetic acid. Since the process of ethanol oxidation into acetic acid is an exothermic one, said fermenting apparatus units are provided with built-in heat exchangers (not shown in the drawing) into which is fed cooling water whose flow rate is automatically controlled depending upon the preset temperature in the apparatus. Temperature control is effected by means of sensing units or pickups (not shown in the drawing) located in the interior (reaction) space of the apparatus.

Air from the apparatus V flows through a splash-interceptor 4 to an absorber 5, wherein the vapors of ethanol and acetic acid are trapped and returned into the process together with water. Water passing through the absorber is used for the preparation of the culture medium. The daily output values of the apparatus are as follows: for the apparatus I 65.7 kg of acetic acid per cu.m; for the apparatus II 66.3 kg; for the apparatus III 45.6 kg; for the apparatus IV 23.7 kg; and for the apparatus V 15.1 kg $CH_3COOH$ per cu.m.

An average daily output per the unit volume of an apparatus equals 43.3 kg $CH_3COOH$, the yield of the specific product being equal to 91 vol. percent.

The above-described microbiological method of producing edible acetic acid may be carried into effect under a variety of working conditions similarly to the technique set forth hereinabove. For the sake of clarity, the main characteristics of the process versus various working conditions are tabulated in Table 1 below.

TABLE 1

| Nos. of operating conditions | Acetic acid concentration in each apparatus P, g/l | | | | | Ethanol concentration in each apparatus of a bank, g/l | | | | | Temperature effective in each apparatus of a bank, t, °C | | | | | Dilution factor in each apparatus D, hr⁻¹ | | | | | Air consumption rate per apparatus $Q \frac{\text{lit. of air}}{\text{lit. of liquid·min.}}$ | | | | | Daily output per apparatus G, kg CH₃OCH/cu.m | | | | | Average output per unit volume, kg CH₃COOH, cu.m·24 hrs | Average yield of specific product, vol. percent |
|---|---|---|---|---|---|---|---|---|---|---|---|---|---|---|---|---|---|---|---|---|---|---|---|---|---|---|---|---|---|---|---|---|
| | P₁ | P₂ | P₃ | P₄ | P₅ | S₁ | S₂ | S₃ | S₄ | S₅ | t₁ | t₂ | t₃ | t₄ | t₅ | D₁ | D₂ | D₃ | D₄ | D₅ | Q₁ | Q₂ | Q₃ | Q₄ | Q₅ | G₁ | G₂ | G₃ | G₄ | G₅ | | |
| 1 | 50.3 | 78.7 | 92.7 | 96.9 | 98.5 | 8.4 | 7.3 | 4.2 | 3.2 | 2.7 | 31.5 | 31.0 | 30.0 | 29.0 | 28.0 | 0.035 | 0.036 | 0.036 | 0.036 | 0.036 | 0.2 | 0.2 | 0.2 | 0.2 | 0.2 | 42.5 | 24.5 | 12.1 | 3.6 | 1.4 | 16.8 | 74.2 |
| 2 | 40.0 | 67.4 | 84.0 | 94.6 | 101.2 | 13.2 | 8.2 | 10.7 | — | 3.5 | 31.5 | 30.0 | 30.0 | 28.5 | 26.0 | .061 | .064 | .066 | .067 | .067 | .2 | .2 | .2 | .2 | .2 | 58.5 | 42.1 | 26.4 | 17.1 | 10.6 | 30.9 | 84.5 |
| 3 | 25.1 | 51.6 | 69.6 | 80.0 | 88.6 | 19.1 | 9.8 | 10.2 | 11.5 | 8.3 | 31.5 | 30.0 | 29.5 | 27.0 | 26.5 | .112 | .115 | .119 | .120 | .120 | .2 | .2 | .2 | .2 | .2 | 67.5 | 73.1 | 51.4 | 30.0 | 24.8 | 49.4 | 95.0 |
| 4 | 48.6 | 70.0 | 82.2 | 89.8 | 95.4 | 19.0 | 12.65 | 8.7 | 4.75 | 1.6 | 31.0 | 30.0 | 28.0 | 27.0 | 26.0 | .0725 | .0755 | .0807 | .0813 | .0813 | .32 | .29 | .19 | .12 | .10 | 84.5 | 38.8 | 23.6 | 14.9 | 11.0 | 34.56 | 89.0 |

The operating conditions 1, 2 and 3 are practicable on a laboratory (pilot) plant with an effective volume of the fermenting apparatus $V_e = 19.6$–$20$ liters of an unaerated culture liquid, while the conditions 4 are practicable on a production plant with an effective volume of the fermenting apparatus $V_e = 6.2$–$6.3$ cu.m of an unaerated culture liquid.

What is claimed is:

1. A microbiological method of producing edible acetic acid by bacterial oxidation of ethanol comprising cultivating acetic-acid bacteria in a continuous submerged growth process on an initial culture medium containing 4 to 7 vol. percent ethanol, acetic acid, mineral salts and water under aeration to produce a first culture liquid containing a concentration of at least 2.5 vol. percent of acetic acid; continuously feeding the initial culture medium to said first culture liquid at a flow rate sufficient to maintain said concentration of acetic acid in the first culture liquid; continuously discharging the first culture liquid at said flow rate to provide a subsequent culture liquid; and further repeating at least twice said ethanol oxidation process in each subsequent culture liquid under aeration and with simultaneous feeding of ethanol to each subsequent culture liquid at a rate sufficient to maintain a constant concentration of acetic acid and ethanol in each subsequent culture liquid, the concentration of ethanol being decreased in each subsequent culture liquid as the concentration of acetic acid increases in each subsequent culture liquid with respect to the previous cultrue liquid in order to maintain the maximum growth factor of the acetic-acid bacteria.

2. A method as claimed in claim 1, wherein the initial culture medium has the following composition: ethanol 4–7 vol. percent, acetic acid 0.5–1.0 vol. percent, disubstituted ammonium phsophate 1 g/l, monosubstituted potassium phosphate 0.5 g/l, magnesium sulfate 0.5 g/l, water being the balance up to 1 l.

3. A method as claimed in claim 1, wherein, the culture medium is fed at a flow rate necessary to maintain the concentration of acetic acid obtained within the limits of 2.7–3 vol. percent in the first culture liquid.

4. A method as claimed in claim 1, wherein the incipient stage of bacteria cultivation process occurs at 29°–31°C and an aeration rate of 2.2 kg O₂/cu.m per hour, with a subsequent temperature reduction down to 25°–26°C and a decrease in aeration rate to 0.3–0.5 kg O₂/cu.m per hour, effective at each oxidation step.

* * * * *